Figure 1:
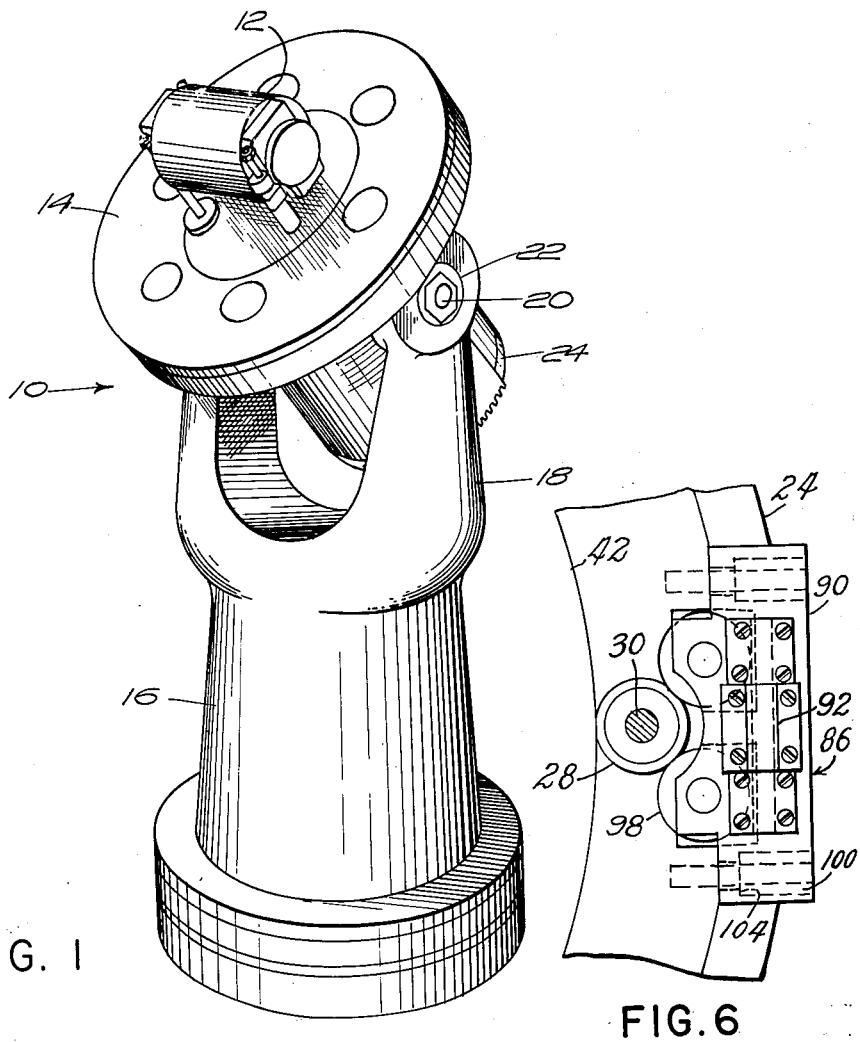

Jan. 14, 1964  J. A. O'SHEA  3,117,458
ANGULAR VELOCITY MULTIPLIER
Filed Aug. 17, 1961  4 Sheets-Sheet 2

INVENTOR.
JOHN A. O'SHEA
BY Morse & Altman
ATTORNEYS

INVENTOR.
JOHN A. O'SHEA
BY Morse + Altman
ATTORNEYS

Jan. 14, 1964　　　J. A. O'SHEA　　　3,117,458
ANGULAR VELOCITY MULTIPLIER
Filed Aug. 17, 1961　　　　　　　　　　　　4 Sheets-Sheet 4
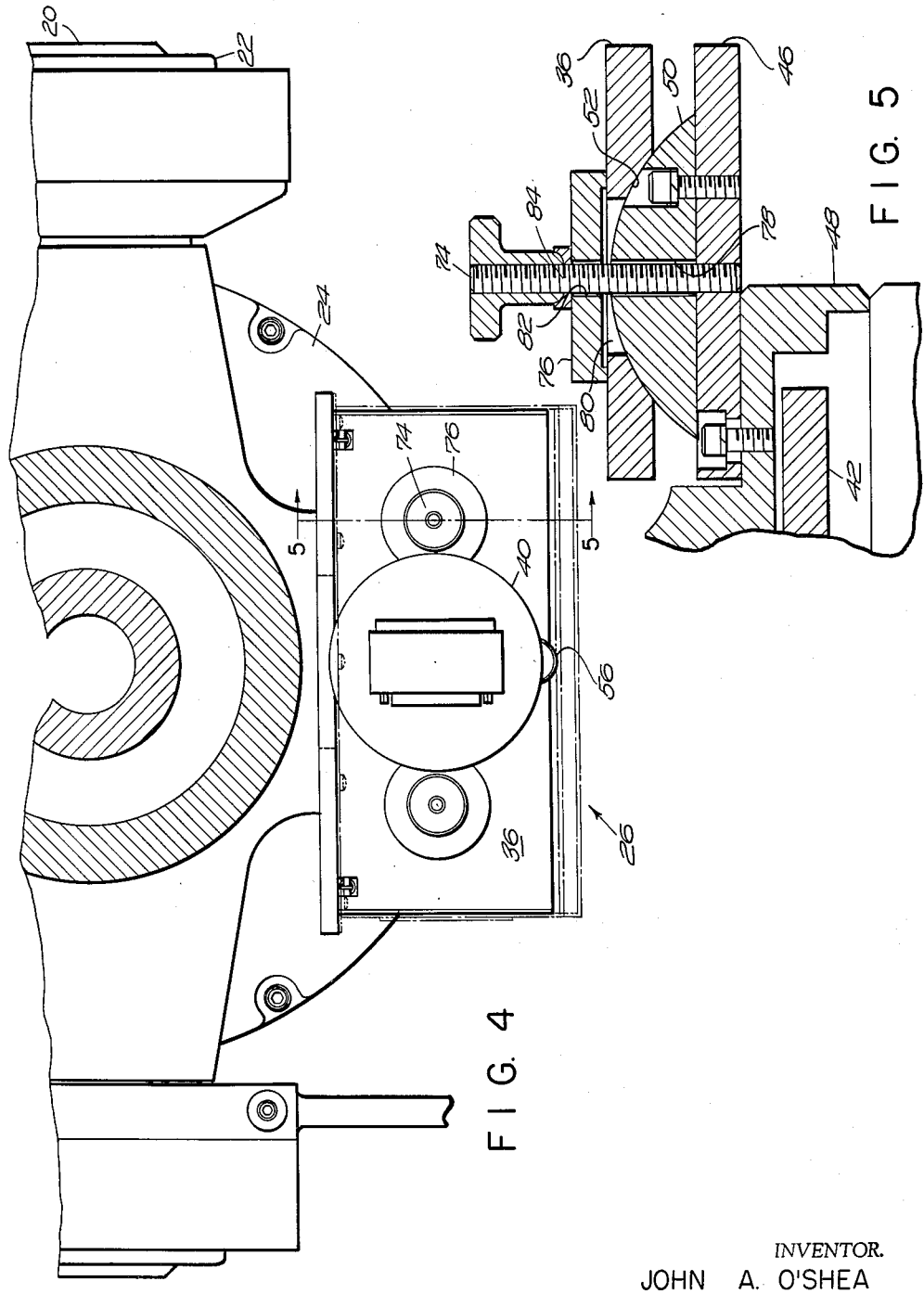
INVENTOR.
JOHN A. O'SHEA
BY
Morse & Altman
ATTORNEYS 3,117,458
ANGULAR VELOCITY MULTIPLIER
John A. O'Shea, Sudbury, Mass., assignor to Dunn Engineering Corporation, Cambridge, Mass., a corporation of Massachusetts
Filed Aug. 17, 1961, Ser. No. 132,185
12 Claims. (Cl. 74—198)

This invention relates in general to angular velocity multipliers and more particularly concerns a variable ratio rate of turn amplifier for use on test turntables for gyros.

In drift testing of high precision gyros, the customary practice is to mount the gyro on a test turntable that has its axis of rotation oriented parallel to the earth's axis of rotation. A motor is arranged to rotate the table in response to electrical signals generated by the gyro as it senses the rotation of the earth. Under ideal operating conditions, the table will remain stationary with respect to inertial space but will rotate one revolution per sidereal day relative to the earth.

By measuring very precisely the rate of turn of the table, it is possible to determine to what extent the gyro may be drifting from its inertial space reference direction.

However, since the table is rotating at only one revolution per day, approximately, it is practically impossible to obtain any sort of useful information by conventional indicators. Heretofore, the practice has been to measure the rate of turn of the table visually by photo electric scanning systems, or by microsyn tracking devices. These measures are not entirely satisfactory because they either lack precision or provide information which must be interpreted along with certain other factors such as turning ratios which normally are not whole numbers. Accordingly, it is an object of the present invention to provide a relatively simple, highly efficient, angular velocity multiplier for gyro rotary test turntables.

Another object of this invention is to provide an angular velocity multiplier in which the ratio between the input and the output may be varied over a relatively wide range.

Yet another object of this invention is to provide in an angular velocity multiplier means for adjusting precisely the ratio between the test turntable and the multiplier.

More particularly, this invention features a precision angular velocity multiplier of particular utility in amplifying the rate of turn of rotary test turntables. In general, the multiplier includes a spherical bearing element of relatively small diameter, which frictionally engages the cylindrical surface of a relatively large diameter turntable and is rotated by it. The axis of rotation of the bearing element may be angularly adjusted through a plane that is radial to the rotational axis of the turntable. The pivot point about which the axis of the bearing element may be adjusted preferably is located in the center of the element so that any angular movement through the plane will change the amplification ratio between the bearing element and the table. When the axes of the table and bearing element are oriented parallel to one another, the line of contact of the element will be about its equator. Any angular change of the axis will move this line of contact away from the equator towards one pole or the other, thereby decreasing the effective circumference of the element and increasing the ratio between the two members.

The bearing element is adjustably supported by means of a swivel plate which is mounted on a pair of spaced hemispherical bosses. The plate and bosses are so arranged and connected as to permit precise angular adjustment of the bearing element only in the plane that is radial to the turntable axis.

But these and other features of the invention, along with further objects and advantages thereof will become more readily apparent from the following detailed description, with reference being made to the accompanying drawings in which:

FIG. 1 is a perspective view of a gyro test turntable on which the multiplier may be mounted.

Figure 2:
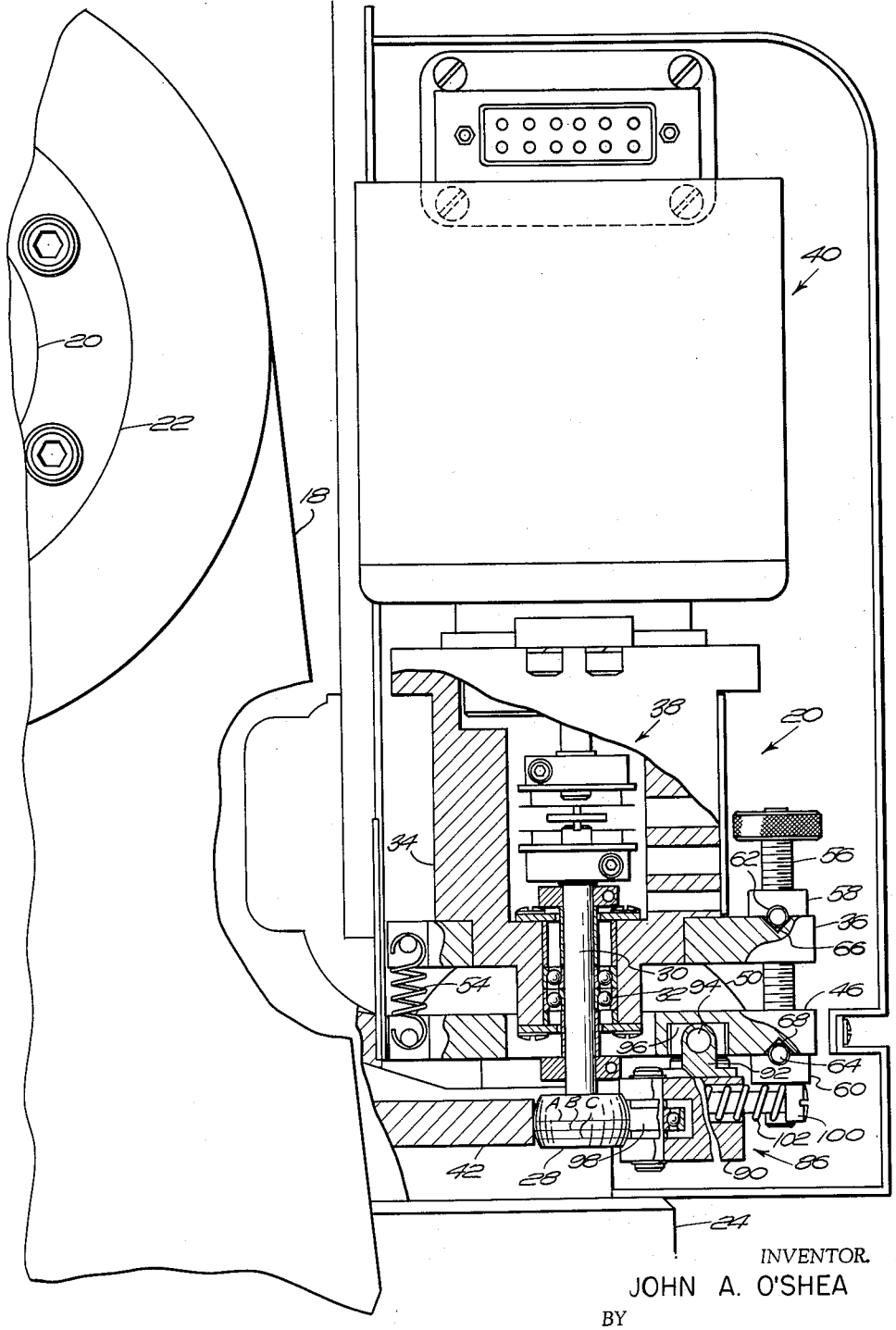
Figure 3:
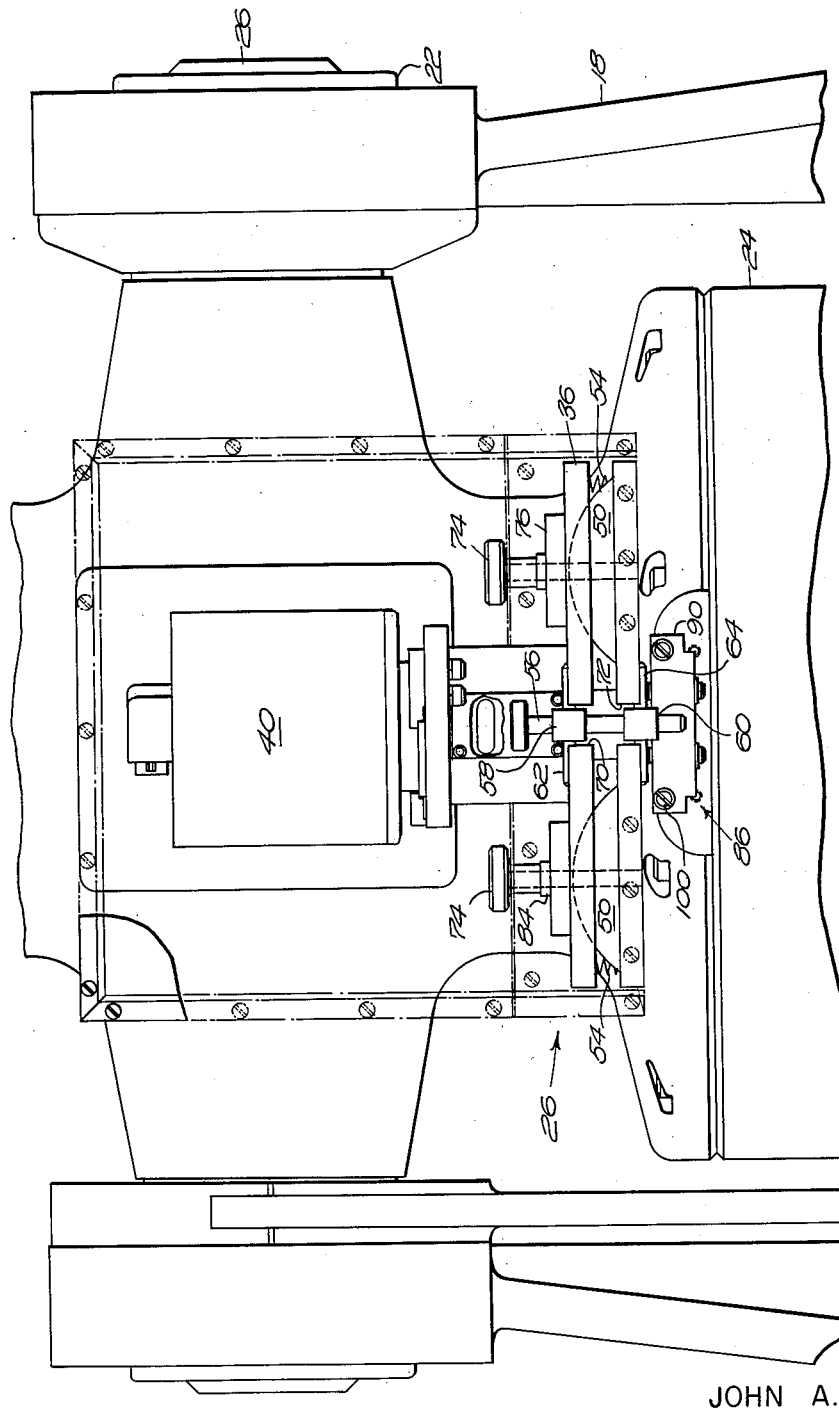

FIG. 2 is a view in side elevation, partly in section, of an angular velocity multiplier made according to the invention, FIG. 3 is a view in front elevation of the multiplier, FIG. 4 is a top plan view of the device, FIG. 5 is a cross sectional view taken along the line 5—5 of FIG. 4, and, FIG. 6 is a top plan view of a pressure loading device for holding the bearing element in contact with the turntable.

Referring now to the drawings, the reference character 10 generally indicates a test table for a gyro unit 12 which is clamped to a circular platform 14 which forms part of the test table. The table 10 includes a stable base 16 with a yoke 18 formed at its upper end. The rotatable platform 14 and a direct drive motor 24 are mounted between the arms of the yoke 18 by trunnions 20 which have their ends journaled in bearings 22. In practice, the test specimen 12 is mounted on the center of the platform 14, and the axis of the table oriented parallel to the earth's axis. A closed loop servo system controls the table with the drive servo input being the gyro unit output signal and representing the angular displacement of the gyro unit case about the input axis from an inertial space reference direction.

It will be understood that when ideal operating conditions exist for both the table and the gyro, the table will remain stationary with respect to inertial space. This will mean that with respect to the earth, the table will revolve once every sidereal day. However, because of gimbal friction and mass unbalance, a certain amount of gyro drift will take place. This residual drift is the prime measure of gyro quality and is determined by measuring the rate of turn of the table.

In order to amplify the very slow rate of turn of the table into a rate of turn which may be conveniently measured, an angular velocity multiplier, indicated generally by reference character 26, is mounted on the table 10.

The multiplier 26 is organized about a spherical bearing element 28 which may be a partial sphere as shown in FIG. 2 or a complete sphere. In either event, the bearing element 28 is mounted fast to the lower end of a shaft 30, which is rotatably mounted by ball bearings 32 to a tubular housing 34 which, in turn, is mounted on a movable upper plate 36. The shaft 30 is connected by a coupling 38 to a readout device such as a resolver 40 which furnishes a visual display of shaft rotation.

The spherical bearing element 28, as best seen in FIG. 2, bears against the smooth outer cylindrical face of a disc 42 which is coupled to the platform 14 and rotates with it. It will be understood that the disc 42 has a much larger diameter than the bearing element 28 so that the bearing element rotates at a much higher rate than the disc, thereby providing amplification of the rate of turn of the table. Assuming that the bearing element 28 were fixed so as to rotate about an axis that was parallel to that of the disc 42 and table platform 14, then the amplification ratio would be constant. In the present invention, this ratio may be varied, as desired, within certain broad limits. A variable amplification ratio is desirable both for flexibility of operation and for convenience in resolving test data. In some installations, the rotating disc 42 may not have a circumference that is evenly proportional to that of the element 28 so that the resulting ratio will not be a whole number. Arithmetically, this makes the product of the readout device somewhat awkward to handle since any reading must be considered together with the existing amplification ratio. By being able to vary the ratio, it is possible to select a convenient ratio of whole numbers (10:1 for example) which will facilitate use of the apparatus. In other situations, it may be desirable to select a specific amplification ratio which is not a whole number.

In any event, the amplification ratio is varied by angularly moving the axis of rotation of the bearing element 28 through a plane that is radial to the axis of the disc 42 (in the plane of the paper as viewed in FIG. 2 or normal to the plane of the paper as viewed in FIG. 3). Preferably, the pivot point for this angular movement is located in the center of the bearing element 28. Thus, when the element 28 is in the position of FIG. 2 with the shaft 30 in a vertical position parallel to that of the table axis, then the line of contact of the element with the disc 42 will extend about the equator of the element as indicated by the circumferential line A in FIG. 2. In this position, the bearing element offers the lowest amplification ratio since the circumferential line of contact A has a greater radius than any other circumferential line that may be drawn on the element. For example, if the shaft 30 is angularly moved to the right in FIG. 2, so that the spherical bearing element 28 is rotated clockwise sufficiently to bring a parallel circumferential line B into contact with the disc 42 then the amplification ratio will be increased since the effective turning radius of the element 28 has been decreased. Further angular adjustment to the right will increase the ratio even more.

It will be understood that if the element 28 were a complete sphere, the shaft 30 could be angularly adjusted through an arc of almost 90 degrees. The only position in which the element 28 will not rotate is when its axis is exactly perpendicular to the moving face of the disc 42. For most situations, it has been found that sufficient variations in the amplification ratio can be obtained by using only the mid-portions of a sphere. For this reason, only a portion of a sphere has been illustrated although a complete sphere may be readily substituted if desired.

The entire multiplier assembly 26 and readout mechanism 40 are supported by a fixed rectangular plate 46, which is bolted along one edge to casing 48 (FIG. 5) which is part of the test table. A portion of the casing is cut away to accommodate the bearing element 28, the shaft 30, and a loading device 86. A pair of hemispherical bosses 50 are mounted on the upper surface of the plate 46 on either side of, and in line with, the shaft 30 which passes through the center of the plate. The bosses 50 serve as bearings for the upper moveable plate 36 which is provided with a pair of hemispherical recesses 52 formed in the bottom surface of the plate. These recesses mate with the bosses 50 so that the plate 36 may be tilted about an axis which passes through the center of the bearing element 28 and is normal to the plane of the paper as viewed in FIGS. 2 and 5. A pair of tensioned coil springs 54 engage opposite inner edges of the lower plate 46 and the upper plate 36 tending to bias the plate 36 in a counter-clockwise direction about the bosses 50. Connecting the opposite outer edges of the two plates 36 and 46 is a differential adjustment screw 56 by which the tilt position of the upper plate 36 may be controlled. It will, of course, be understood that the plate 36 supports the housing 34 which carries the shaft 30 and the bearing element 28 so that any change in the position of the upper plate will cause a corresponding angular change in the position of the bearing element 28. It follows, then, that the amplification ratio is varied by tilting the plate 36.

Referring more particularly to FIGS. 2 and 3, it will be seen that the differential adjustment screw 56 is in threaded engagement with a pair of pivot blocks 58 and 60. Both pivot blocks are provided with oppositely extending arms 62 and 64 which are received in pairs of V grooves 66 and 68 formed in the upper surface of the upper plate 36 and in the lower surface of the lower plate 46. Both the plates have center marginal recesses 70 and 72 to accommodate the pivot blocks 68 and 60. The differential adjustment screw 56 preferably is formed with 28 UNF threads on the lower half and 32 NEF threads on the upper half. This allows for very precise control in adjusting the angular position of the upper plate. By rotating the screw 56 in one direction or the other, the outer edge of the plate 36 will be biased to or away from the opposite outer edge of the plate 46.

In practice, once the desired ratio has been set by manipulation of the screw 56, the parts are locked together to prevent an unintentional alteration in the relative positions of the several members such as would change the amplification ratio. The locking arrangement for the multiplier includes a screw 74 and a clamping washer 76 for each of the bosses 50. As best seen in FIG. 5, the shank of the screw 74 passes through a central bore 78 formed in the boss 50 and is threaded to the lower plate 46. The upper plate 36 is formed with a rather wide circular opening 80 concentric with the hemispherical recess 52. The washer 76 spans the opening 80 and is also provided with an enlarged central opening 82 to accommodate the screw 74. A smaller washer 84 is mounted over the washer 76 and is formed with a spherical seat to mate with the spherical lower end of the screw head. When tilting the upper plate 36, the screw 74 is loosened sufficiently to permit movement of the plate. Once the angular position has been selected, the screw is tightened to clamp the several parts into locking engagement.

To prevent slippage between the bearing element 28 and the disc 42, when the disc is rotating, the pressure loading device 86 is suspended from the underside of the lower plate 46 and engages the element 28 to apply sufficient inward radial pressure as to insure proper frictional engagement between the parts.

The loading device as best shown in FIGS. 2, 3, and 6 comprises a generally rectangular bracket 90 having a pivot arm 92 mounted to its upper surface and hinged by a pin 94 within a recess 96 formed in the underside of the lower plate 46. The bracket carries a pair of ball-bearing assemblies 98 mounted side by side with their axes of rotation being parallel with that of the disc 42. The outer races of the two bearings engage the spherical bearing element 28 at two points on the element about 90 degrees apart. Pressure may be applied by the ball-bearings 98 against the element 28 by tightening up on a pair of screws 100 which pass through openings 101 formed in the bracket 90 and engage the casing 48. A compression spring 102 is located in the opening 101 with one end restrained by the head of the screw 100 and the opposite end restrained by a shoulder 104 formed in the opening 101. By selective adjustment of the two screws 100 an even and optimum loading pressure may be obtained for the bearing element 28.

While the invention has been described with particular reference to the illustrated embodiment, it will be understood that numerous modifications may be made by those skilled in the art without departing from the invention.

Having thus described my invention, what I claim and desire to obtain by Letters Patent of the United States is:

1. Apparatus for multiplying the angular velocity of a rotating circular body having a smooth peripheral surface, comprising a spherical element rotatably mounted in frictional driving engagement against said peripheral surface, said element having a diameter less than that of said circular body, a shaft coaxially supporting said element and rotatable therewith, a fixed lower plate, a pair of spaced hemispherical bosses mounted on the upper surface of said lower plate, an upper plate having a pair of spherical recesses formed therein in register with said bosses and of somewhat smaller diameter, spring elements engaging opposing marginal portions along one side of said upper and lower plates, pivoting means engaging opposing marginal portions along another side of said upper and lower plates, an adjustment screw threaded to both of said pivoting means and adapted to pivot said upper plate about an axis along which are located the center of curvature of said bosses and said element, said axis being normal to the axis of said circular body and approximately tangential to said peripheral surface, said shaft along with said element being supported by said upper plate and pivotable therewith, means for locking said upper plate in a selected angular position, a pair of roller bearings engaging said element to hold said element against said peripheral surface and means connecting said shaft for measuring the rate of turn of said shaft.

2. Apparatus for multiplying the angular velocity of a rotating circular body having a smooth peripheral surface, comprising a spherical element rotatably mounted in frictional driving engagement against said peripheral surface, a shaft coaxially supporting said element and rotatable therewith, a fixed first plate, a pair of spaced hemispherical bosses mounted on the upper surface of said first plate, a second plate having a pair of spherical recesses formed therein in register with said bosses, biasing means engaging opposing marginal portions along one side of said first and second plates, pivoting means engaging opposing marginal portions along another side of said first and second plates, an adjustment screw engaging both of said pivoting means and adapted to pivot said second plate about an axis along which are located the center of curvature of said bosses and said element, said axis being normal to the axis of said circular body and approximately tangential to said peripheral surface, said shaft along with said element being supported by said second plate and pivotable therewith, means for locking said second plate in a selected angular position, and means connecting said shaft for measuring the rate of turn of said shaft.

3. Apparatus for multiplying the angular velocity of a rotating circular body having a smooth peripheral surface, comprising a spherical element rotatably mounted in frictional driving engagement against said peripheral surface, a shaft coaxially supporting said element and rotatable therewith, a fixed lower plate, a pair of spaced hemispherical bosses mounted on the upper surface of said lower plate, an upper plate having a pair of spherical recesses formed therein in register with said bosses, biasing means engaging opposing marginal portions along one side of said upper and lower plates, counter-biasing means engaging opposing marginal portions along another side of said upper and lower plates and adapted to pivot said upper plate about an axis along which are located the center of curvature of said bosses and said element, said axis being normal to the axis of said circular body and approximately tangential to said peripheral surface, said shaft along with said element being supported by said upper plate and pivotable therewith, means for locking said upper plate in a selected angular position, and means connecting said shaft for measuring the rate of turn of said shaft.

4. Apparatus according to claim 3 including a pair of roller bearings engaging said element to hold said element against said peripheral surface.

5. Apparatus for multiplying the angular velocity of a rotating circular body having a smooth peripheral surface, comprising a generally spherical element rotatably mounted in frictional driving engagement against said peripheral surface, a shaft coaxially supporting said element and rotatable therewith, a fixed lower plate, a pair of spaced hemispherical bosses mounted on the upper surface of said lower plate, an upper plate having a pair of spherical recesses formed therein in register with said bosses, biasing means engaging opposing marginal portions along one side of said upper and lower plates, counter-biasing means engaging opposing marginal portions along another side of said upper and lower plates and adapted to pivot said upper plate about an axis along which are located the center of curvature of said bosses and said element, said axis being normal to the axis of said circular body and approximately tangential to said peripheral surface, said shaft along with said element being supported by said upper plate and pivotable therewith, and means connecting said shaft for measuring the rate of turn of said shaft.

6. Apparatus according to claim 5 including means for locking said upper plate in a selected angular position.

7. Apparatus for multiplying the angular velocity of a rotating circular body having a smooth peripheral surface, comprising a spherical element rotatably mounted in frictional driving engagement against said peripheral surface, said element having a diameter less than that of said circular body, a shaft coaxially supporting said element and rotatable therewith, a fixed lower plate, a pair of spaced hemispherical bosses mounted on the upper surface of said lower plate, an upper plate having a pair of spherical recesses formed therein in register with said bosses, biasing means engaging opposing marginal portions along one side of said upper and lower plates, adjustable counter-biasing means engaging opposing marginal portions along another side of said upper and lower plates and adapted to pivot said upper plate about an axis along which are located the center of curvature of said bosses and said element, said axis being normal to the axis of said circular body and approximately tangential to said peripheral surface, said shaft along with said element being supported by said upper plate and pivotable therewith, and means connecting said shaft for measuring the rate of turn of said shaft.

8. Apparatus according to claim 7 including means for locking said upper plate in a selected angular position.

9. Apparatus for multiplying the angular velocity of a rotating circular body having a cylindrical outer surface, comprising a generally spherical element rotatably mounted in frictional engagement against said surface, a shaft coaxially supporting said element and rotatable therewith, a fixed first member, a pair of hemispherical bosses mounted on the upper surface of said first member, a second member having a pair of spherical recesses formed therein in mating engagement with said bosses, biasing means engaging opposing marginal portions along one side of said members and adjustable counter-biasing means engaging opposing marginal portions along another side of said members and adapted to pivot said second member about an axis along which are located the center of curvature of said bosses and said element, said axis being normal to the axis of said circular body and approximately tangential to said cylindrical surface, said shaft along with said element being supported by said second member and pivotable therewith.

10. Apparatus for multiplying the angular velocity of a rotating circular body having a cylindrical outer surface, comprising a generally spherical element rotatably mounted in frictional driving engagement against said cylindrical surface, said element having a diameter less than that of said circular body, a shaft coaxially supporting said element and rotatable therewith, a moveable member rotatably supporting said shaft and adapted to pivot said shaft about an axis along which is located the center of curvature of said element, said axis being normal to the axis of said circular body and approximately tangential to said cylindrical surface, means for locking said member in a selected angular position, a pair of roller bearings engaging said element to hold said element against said cylindrical surface and means connecting said shaft for measuring the rate of turn of said shaft.

11. Apparatus for multiplying the angular velocity of a rotating circular body having a cylindrical outer surface, comprising a generally spherical element rotatably mounted in frictional driving engagement against said cylindrical surface, a shaft coaxially supporting said element and rotatable therewith, a moveable member rotatably supporting said shaft and adapted to pivot said shaft about an axis along which is located the center of curvature of said element, pivoting of said shaft being operative to change the effective diameter of said element, said axis being normal to the axis of said circular body and approximately tangential to said cylindrical surface, means for locking said member in a selected angular position, and means connecting said shaft for measuring the rate of turn of said shaft.

12. Apparatus for multiplying the angular velocity of a rotating circular body having a smooth peripheral surface, comprising a spherical element rotatably mounted in frictional driving engagement against said peripheral surface, said element having a diameter less than that of said circular body, a shaft coaxially supporting said element and rotatable therewith, a moveable member rotatably supporting said shaft and adapted to pivot said shaft about an axis along which is located the center of curvature of said element, said axis being normal to the axis of said circular body and approximately tangential to said peripheral surface, pivoting of said shaft being operative to change the effective diameter of said element and means connecting said shaft for measuring the rate of turn of said shaft.

References Cited in the file of this patent
UNITED STATES PATENTS

| | | |
|---|---|---|
| 2,056,101 | Hall | Sept. 29, 1936 |
| 2,816,421 | Humphrey et al. | Dec. 17, 1957 |